United States Patent

[11] 3,578,068

| [72] | Inventors | Daniel L. Elliott<br>Southington;<br>Gary D. Burr, Berlin, Conn. |
|---|---|---|
| [21] | Appl. No. | 832,263 |
| [22] | Filed | June 11, 1969 |
| [45] | Patented | May 11, 1971 |
| [73] | Assignee | United Aircraft Corporation<br>East Hartford, Conn. |

[54] TEMPERATURE RESPONSIVE PASSIVE VARIABLE THERMAL CONDUCTANCE DEVICE
9 Claims, 4 Drawing Figs.

[52] U.S. Cl. ..................................................... 165/39,
165/86, 165/96
[51] Int. Cl. ...................................................... B60h 1/00

[50] Field of Search............................................ 165/32, 96,
39, 144, 135, 86, 136

[56] References Cited
UNITED STATES PATENTS
3,377,941  4/1968  Jaremus ...................... 165/32

*Primary Examiner*—Charles Sukalo
*Attorney*—Melvin Pearson Williams

ABSTRACT: Heat conductivity through a device in a given direction is achieved by a pair of relatively rotatable thermal anisotropies having mutual interfacing surfaces of constant area. The overall thermal conductance of the assembly varies with the relative angular position of the elements in response to a temperature responsive element such as a bimetallic spring or a fluid-charged bellows.

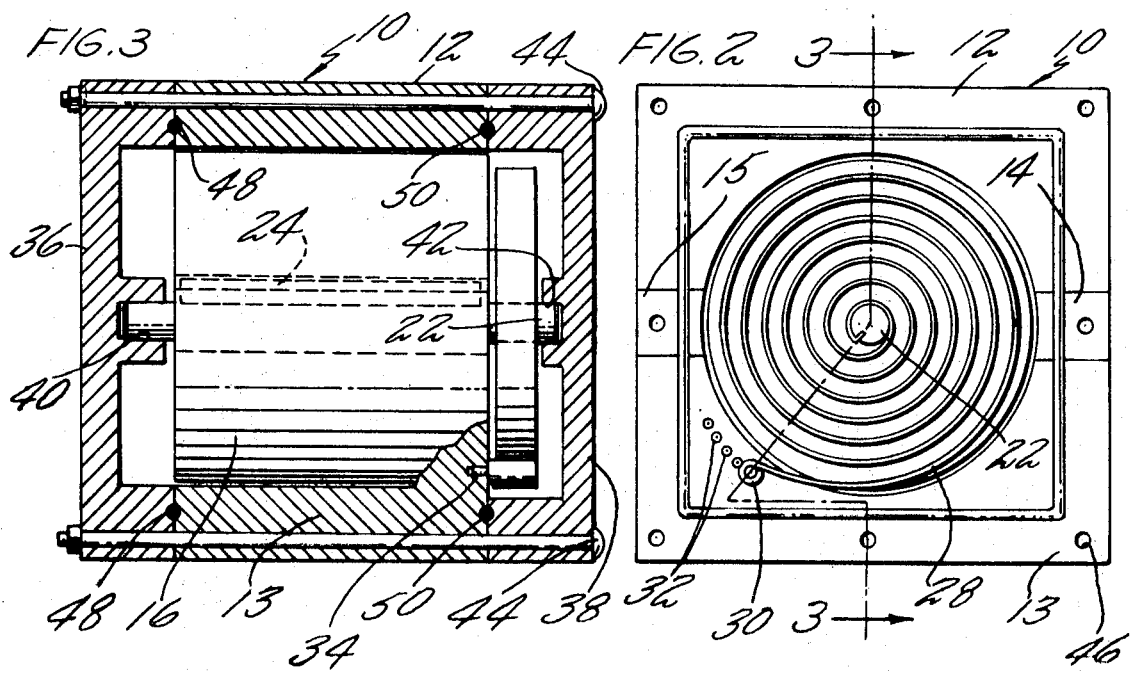
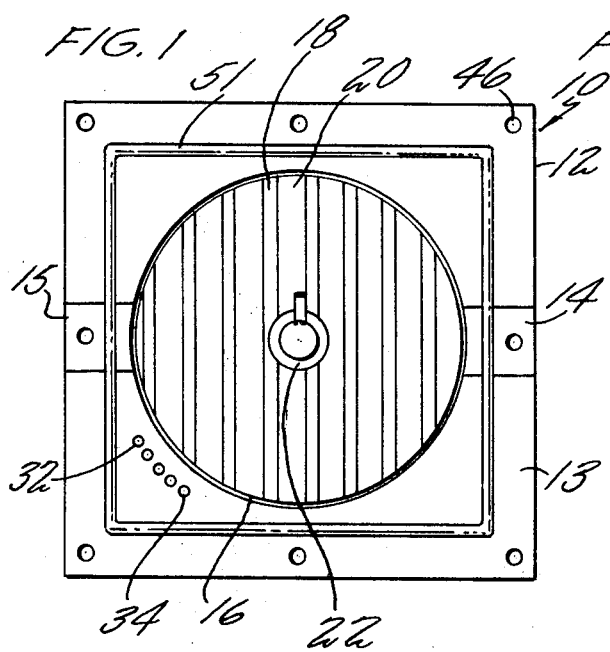
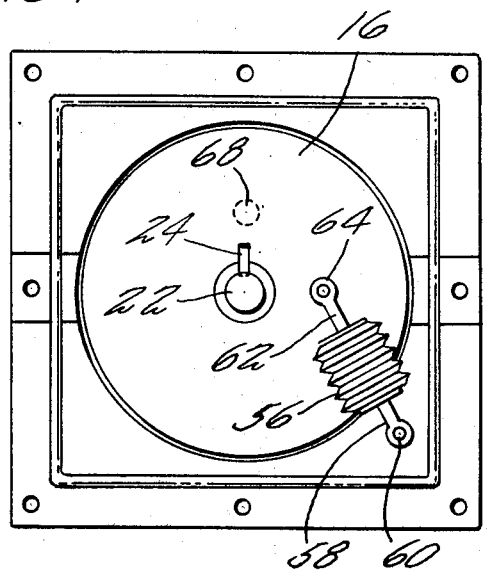
INVENTOR
DANIEL L. ELLIOTT
GARY D. BURR
BY *Melvin Pearson Williams*
ATTORNEY

TEMPERATURE RESPONSIVE PASSIVE VARIABLE THERMAL CONDUCTANCE DEVICE

BACKGROUND OF THE INVENTION

1. Field of Invention

This invention relates to thermal conducting devices, and more particularly to an improved temperature responsive passive variable thermal conductance device.

2. Description of the Prior Art

Many areas are known to the art wherein control over the temperature of apparatus becomes significant. Particularly, electronic circuitry is known to have temperature-sensitive operating characteristics. In military and space applications, where a wide range of environmental conditions can exist, and where load demands on circuitry can vary by extreme amounts, temperature control becomes both more important and more difficult to achieve.

A wide variety of devices are known in the art for varying the conductance between apparatus, the temperature of which is to be controlled, and an ambient thermal sink to which generated heat is transported. However, devices known to the prior art either rely upon variable contacting surfaces, which have an inherent sensitivity to interface characteristics, or rely on a variable volume of heat-conducting fluid (such as mercury), which is not capable of use in high shock and vibration environments since the mercury tends to separate into discrete masses, thereby grossly altering the operating characteristics of the device. Further, a number of devices are available in the art which require electric or other prime power sources in conjunction with a temperature sensor in order to alter conductivity for temperature control. It is known that in most space and military applications, as well as a variety of commercial applications, by far the greatest intensity of shock and vibration is produced by linear shock and linear vibration, in contrast with rotary shock and vibration sources. Many devices known to the art rely on linear motions, and are therefore highly sensitive to linear shock and vibration.

SUMMARY OF INVENTION

Objects of the invention include the provision of a temperature responsive variable thermal conductance device which is:
relatively insensitive to accelerations;
which is passive, requiring no operating power; and
which is capable of operation in a continuously variable temperature/thermal conductance profile.

According to the present invention a pair of relatively rotating thermal anisotropic devices have a mutual interface, the area of which is constant with respect to the direction of primary heat conduction in either of said bodies, the amount of heat conduction across the pair, or between them, being a function of the angle of rotation between the respective directions of primary heat conduction of the two bodies. In accordance further with the present invention, the relative angular position of the two bodies is adjusted by a passive, thermally responsive element; in one form, the present invention may utilize a bimetallic spring element; in another form, the invention may utilize a fluid-charged bellows, or other temperature responsive expansion device.

Because the varying thermal characteristics depend only on relative angular position, the device is insensitive to linear vibration, shock and acceleration, and is therefore insensitive to the most frequent and the most severe forces of the dynamic environment of the device. Additionally, no power supply is required. Further, the device provides a full range of variable conductance which is continuous, repeatable, predictable and has no major slope variations. The unit can be fabricated in a lightweight, compact device readily incorporated into the structure of instrumentation packaging, and may be implemented in a variety of easily manufactured, low cost embodiments.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is an end elevation view of one embodiment of the invention with the end cap removed;

FIG. 2 is an end elevation view of the embodiment of FIG. 1 with the end cap removed but with a thermally responsive spiral spring in place;

FIG. 3 is a sectioned side elevation view of the embodiment of the invention illustrated in FIGS. 1 and 2; and FIG. 4 is a front elevation view of an alternative embodiment of the present invention.

DESCRIPTION OF THE PREFERRED EMBODIMENT

Referring now to FIGS. 1 and 3, one embodiment of the present invention includes a composite housing 10 which may, for instance, comprise two aluminum sections 12, 13 joined by a pair of titanium or stainless steel sections 14, 15. Although not shown in the drawing, the sections 12—15 may be joined together in any one of a number of well-known ways, typically those used in formation of laminated structures in the art. For instance, they may be bonded, welded (such as using a deep electron beam weld), brazed or soldered, or fastened with vertically disposed bolts or machine screws. The sections 12 and 13 are good conductors, but the sections 14 and 15 are poor conductors; also, the cross-sectional area of elements 14 and 15 is relatively small. Therefore, thermal conduction between the element 12 and the element 13 directly through the elements 14 and 15 is minimal. Disposed within the composite housing 10 is an anisotropic slug or rotor 16 which is composed of laminations of insulating material 18 and conductive material 20 interleaved in alternating layers. The relative thicknesses of the layers can be altered to suit any design expedient; however, the greatest ratio of maximum thermal conductivity to minimum thermal conductivity is most readily achieved by having relatively thick conducting layers 20 separated by relatively thin insulating layers 18 of high insulating quality. The slug 16 is disposed on a shaft 22 having a key 24 with which it becomes angularly interlocked with the slug 16. The method of keying the shaft 22 to the slug 16 may be implemented in any way well known in the art. Alternatively, a cylindrical shaft could be bonded directly within the slug, or the slug could have short shafts screwed into opposite surfaces thereof, as is known in the art.

When the laminations 18, 20 are vertical as shown in FIG. 1, there will be maximum thermal conduction between the element 12 of the composite block 10 through the slug 16 to the element 13. On the other hand, when the laminations 18, 20 are aligned horizontally (as viewed in FIG. 1), there will be a minimum conduction between the elements 12 and 13 through the slug 16. Between these two positions, there is continuously varying thermal conduction which is a direct function of the relative angular position of the slug 16 with respect to the composite block 10.

Either or both block 10 and the slug 16 may alternatively be comprised of a single or multiple pieces of thermally anisotropic material. For instance, pyrolytic graphite, made by condensing carbon vapor in molecular layers with a random stacking, provides a thermal anisotropy having a ratio on the order of magnitude of 200 to 1 between the orientations of maximum and minimum thermal conductance. This material is available under the trademark PYROID from Pyrogenics Inc., Woodside, New York. Thus, the material or method of providing thermal anisotropy within the block 10 and the slug 16 is immaterial, the only significant aspect of the present invention herein being the provision of relatively rotatable anisotropies having a continuously variable thermal conductance across a constant interface area.

The relative angular position between the slug 16 and the housing 10 is controlled in the present embodiment by a bimetallic spiral spring 28 (FIG. 2). The spring 28 is fixed to the shaft 24 such as by being passed through a slot in the shaft, or it may alternatively be pinned or otherwise fixed thereto. The outer end 30 of the spring 28 may be fixed in a variety of positions by being pinned (or screwed) into any one of a plurality of holes 32—34 (FIGS. 1 and 2). As configured in FIGS. 1—3 herein, an increase in temperature will cause the spring to expand and the shaft 24 to move in a counterclockwise direction as seen in FIGS. 1 and 2. The range of temperatures is primarily determined by the characteristics of the spring including the number of turns and thickness of materials, as is known in the art. However, the absolute temperature base of the range of temperature can be adjusted by selection of one of the holes 32—34. For a range at higher temperature, the hole 32 would be utilized, similarly, for lower temperatures, the hole 34 could be utilized. Of course, additional holes could be provided to extend the degree of adjustment of the nominal operating range.

To adjust the device for a given utilization, the device would be placed in an ambient having the desired operating temperature, and a spring properly designed to have a desired operating range, of an indeterminate length (not having been cut to size) is positioned on the shaft with the slug 16 oriented for maximum conductance (such as the laminations 18, 20 being in a vertical position as shown in FIG. 1). The unit is then placed in an ambient having the desired maximum temperature of operation of apparatus to be thermally controlled thereby. Then, the end point of the spring is defined as that which will fit into one of the holes 32—34 selected for operation, and the portion of the spring adjacent to the hole is fastened to the hole and the excess material of the spring is removed. Normally, one of the holes between holes 32, 34 which represents a midrange position would be chosen for this operation to allow for final calibration and adjustment.

As seen in FIG. 3, the block 10 may have a pair of end plates 36, 38, preferably of a low thermal conductance material such as titanium or stainless steel, and having shaft journals 40, 42. The end plates 36, 38 and the block 10 may be secured by bolts 44 passing through holes 46 (FIG. 1) in the block. A fluid seal may be provided between the end plates 36, 38 by gaskets 48, 50 disposed in grooves 51.

The preferred embodiment of the present invention employs a fluid having high thermal conductivity and a suitable viscosity to minimize the thermal resistance at the interface between the slug 16 and the block 10 as well as to provide a certain amount of viscous damping to assure a suitable level of angular stability with respect to forces supplied thereto from the external dynamic environment. A wide variety of suitable fluids, such as silicone oils, are available in the market place.

An alternative embodiment in the invention is illustrated in FIG. 4, wherein a fluid-charged bellows 56 is adapted to be pivotably disposed on a block 10 such as by an arm 58 and a pin 60. The bellows 56 may be provided with an arm 62 which is pinned (64) to the slug 16. As temperature increases, the bellows 56 expands, and drives the arm 62 so as to rotate the slug 16 in a counterclockwise direction so that the pin 62 assumes the position shown dotted at 68. For this alternative embodiment, it is to be noted that the initial position of the slug 16 (at its maximum operating temperature) is not vertical as depicted in FIG. 1, but instead horizontal. In this way decreasing temperatures, causing a bellows contraction and a change in the position of arm 62 from location 68, will effect a decrease in the device's thermal conductance. The bellows 56 may contain a liquid such as mercury or any suitable gas, such as Freon. Additionally, a fluid may be chosen and established at a suitable pressure within the bellows 56 such that the temperature of vaporization will be at or near the middle temperature of the operating range of the device in its intended use. Thus, as temperature increases, a greater portion of the fluid becomes gaseous thereby imparting significant motion to the arm 62, whereas the lowering of temperature will result in liquification of the greater portion of the gas thus causing the bellows to contract significantly and move the arm 62 commensurately. A variety of other thermally responsive devices may be utilized to provide relative angular rotation between the slug 16 and the block 10, a number of which will be apparent to those skilled in the art. Similarly, the device may be implemented in a variety of materials and configurations.

Thus, although the invention has been shown and described with respect to preferred embodiments thereof, it should be understood by those skilled in the art that the foregoing and various other changes and omissions in the form and detail thereof may be made therein without departing from the spirit and the scope of the invention.

We claim:

1. A temperature-responsive passive variable thermal conductance device comprising:
   a pair of members defining a heat-conducting path, each of said members having an anisotropic heat transfer characteristic, one of said members surrounded by and rotatably disposed within an area defined by the other of said members, said members having a contiguous proximate interface; and
   means responsive to temperature for rotating said one member with respect to said other member.

2. A temperature-responsive passive variable thermal conductance device comprising:
   a block having a thermally anisotropic composition and a central bore therethrough;
   a cylindrical slug having a thermally anisotropic composition rotatably disposed within said block, the outer diameter of said slug being substantially as large as the diameter of said bore, whereby said slug and said block have a continuous interface comprising a small clearance relative to the size of said slug; and
   means providing relative rotation between the slug and said block in response to temperature.

3. A variable thermal conductance device comprising:
   a first thermally anisotropic member;
   a second thermally anisotropic member disposed for angular rotation with respect to said first member, said members being so configured, oriented and disposed that different angular positions therebetween result solely in differing orientations of the anisotropies thereof.

4. The device according to claim 3 further comprising: means for rotating one of said members with respect to the other of said members in response to temperatures.

5. The device according to claim 3 further comprising: means for angularly positioning one of said members with respect to the other of said members in response to temperature.

6. The device according to claim 1 wherein said temperature responsive means comprises a thermally flexing spiral spring having its proximal end disposed on said slug and its distal end disposed on said block.

7. The apparatus according to claim 1 wherein said temperature responsive means comprises a fluid-charged bellows having one end connected to said block and the other end connected to said slug.

8. The device according to claim 4 wherein said temperature responsive means comprises a thermally flexing spiral spring having its proximal end disposed on said slug and its distal end disposed on said block.

9. The apparatus according to claim 4 wherein said temperature responsive means comprises a fluid-charged bellows having one end connected to said block and the other end connected to said slug.